United States Patent
Zhu et al.

(10) Patent No.: US 11,697,406 B2
(45) Date of Patent: Jul. 11, 2023

(54) VEHICLE OPERATION SAFETY MODEL COMPLIANCE MEASUREMENT

(71) Applicants: Mobileye Vision Technologies Ltd., Jerusalem (IL); Qianying Zhu, Beijing (CN); Ping Guo, Beijing (CN); Xinxin Zhang, Beijing (CN); Fei Li, Beijing (CN); Xiangbin Wu, Beijing (CN)

(72) Inventors: Qianying Zhu, Beijing (CN); Ping Guo, Beijing (CN); Xinxin Zhang, Beijing (CN); Fei Li, Beijing (CN); Xiangbin Wu, Beijing (CN)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

(21) Appl. No.: 17/789,712

(22) PCT Filed: Nov. 19, 2021

(86) PCT No.: PCT/IB2021/000804
§ 371 (c)(1),
(2) Date: Jun. 28, 2022

(87) PCT Pub. No.: WO2022/106896
PCT Pub. Date: May 27, 2022

(65) Prior Publication Data
US 2023/0049128 A1    Feb. 16, 2023

(30) Foreign Application Priority Data
Nov. 19, 2020   (WO) ................ PCT/CN2020/130231

(51) Int. Cl.
*B60T 17/22*    (2006.01)
*B60T 8/17*     (2006.01)
*B60T 8/171*    (2006.01)

(52) U.S. Cl.
CPC ............ *B60T 17/221* (2013.01); *B60T 8/171* (2013.01); *B60T 2210/32* (2013.01); *B60T 2250/04* (2013.01); *B60T 2270/406* (2013.01)

(58) Field of Classification Search
CPC .... B60T 17/221; B60T 8/171; B60T 2210/32; B60T 2250/04; B60T 2270/406
See application file for complete search history.

(56) References Cited

U.S. PATENT DOCUMENTS 8,606,478 B2 * 12/2013 Samsioe .................. B60T 7/22
701/87
10,713,502 B2   7/2020 Tiziani
(Continued)

FOREIGN PATENT DOCUMENTS

WO   WO-2020223248 A1    11/2020
WO   WO-2022106896 A1    5/2022

OTHER PUBLICATIONS

"International Application Serial No. PCT/IB2021/000804, International Search Report dated Mar. 17, 2022", 2 pgs.
(Continued)

*Primary Examiner* — Tyler J Lee
(74) *Attorney, Agent, or Firm* — Schwegman Lundberg & Woessner, P.A.

(57) ABSTRACT

System and techniques for vehicle operation safety model (VOSM) compliance measurement are described herein. A subject vehicle is tested in a vehicle following scenario against VOSM parameter compliance. The test measures the subject vehicle activity during phases of the following scenario in which a lead vehicle slows and produces log data and calculations that form the basis of a VOSM compliance measurement.

29 Claims, 7 Drawing Sheets

(56) References Cited

U.S. PATENT DOCUMENTS

| | | | |
|---|---|---|---|
| 10,752,231 B2* | 8/2020 | Rasmussen | ............... B60T 8/17 |
| 2010/0280729 A1* | 11/2010 | Samsioe | ............. B60W 10/196 |
| | | | 701/93 |
| 2019/0225212 A1 | 7/2019 | Buerkle et al. | |
| 2021/0331655 A1* | 10/2021 | So | ........................... B60T 17/22 |

OTHER PUBLICATIONS

"International Application Serial No. PCT/IB2021/000804, Written Opinion dated Mar. 17, 2022", 3 pgs.

* cited by examiner

VEHICLE OPERATION SAFETY MODEL COMPLIANCE MEASUREMENT

PRIORITY CLAIM

This application is a U.S. National Stage Application under 35 U.S.C. 371 from International Application No. PCT/IB2021/000804, filed Nov. 19, 2021, and published as WO 2022/106896 on May 27, 2022, which claims the benefit of priority to International Application No. PCT/CN2020/130231, filed Nov. 19, 2020, each of which are incorporated herein by reference in their entirety.

TECHNICAL FIELD

Embodiments described herein generally relate to automated driving or driver assisted driving and more specifically to vehicle operation safety model compliance measurement.

BACKGROUND

Autonomous driving and driver assistance systems are becoming more common place. These systems use vehicle sensor data to control, or help control (e.g., via driver prompts, partial steering input, emergency braking, etc.) the vehicle. Autonomous driving systems can fully control the vehicle without driver assistance, whereas assisted driving systems augment a driver's control of the vehicle. Assisted driving systems may be referred to as advanced driver assistance systems (ADAS) systems, developed to automate, adapt, or enhance vehicle systems to increase safety and provide better driving. In such systems, safety features are designed to avoid collisions and accidents by offering technologies that alert the driver to potential problems, or to avoid collisions by implementing safeguards and taking over control of the vehicle.

While autonomous driving and ADAS systems have incorporated various safety features, there is movement to create verifiable safety models for the operation of vehicles. These models tend to formalize the parameters of motion and interaction between vehicles, use those parameters to model vehicle presence in the world, and define acceptable interactions between vehicles based on the vehicle presence. One such vehicle operation safety model (VOSM) is Responsibility-Sensitive Safety (RSS).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
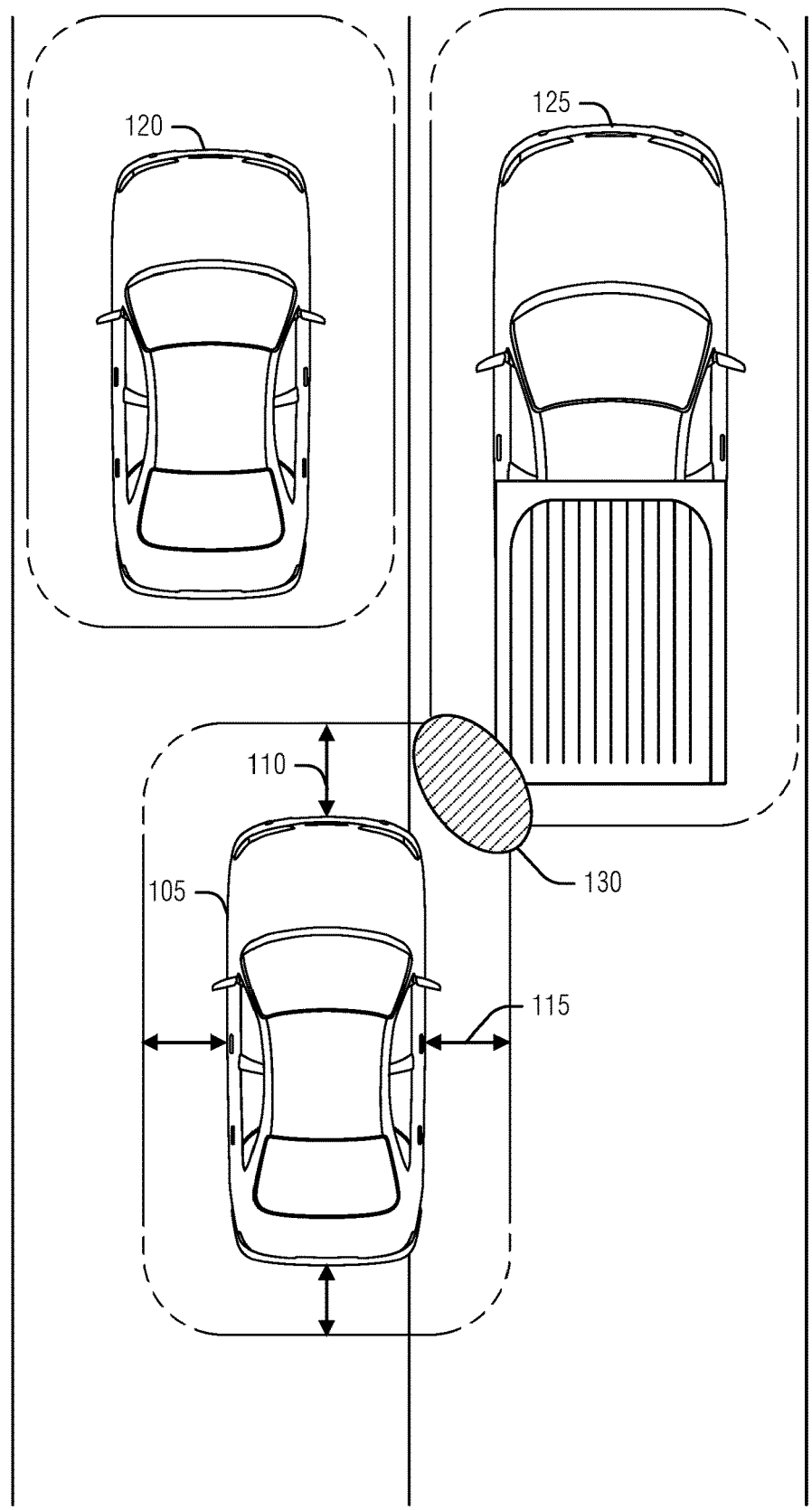
FIG. 1 illustrates an example of a moving vehicle scenario demonstrating a VOSM, according to an embodiment.

VOSMs, such as RSS, generally define several parameters of individual vehicles and uses these parameters to model a set of distances which determine whether a vehicle is safe or not. Generally, the safe distances address sufficient longitudinal distance and sufficient lateral distance. FIG. 1 illustrates some of these parameters in the context of sufficient (e.g., safe) longitudinal and lateral distances.

Current testing methods for autonomous or assisted vehicle car-following tests generally only verify a final distance between the following vehicle and the leading vehicle. If there's no collision, generally, the test will be considered a success (e.g., passed). Some VOSMs, such as RSS, additionally require certain corrective actions to be taken when a dangerous situation is detected, even in the absence of a collision. Thus, under these VOSMs, a vehicle passes the test only when the vehicle engages in a proper response as defined by the VOSM after perceiving a dangerous situation. These more complicated VOSMs, or the industry at large, may not obtain necessary safety information about vehicles from current testing techniques.

To address these issues, a testing technique that verifies the final state (e.g., collision or no collision) and also monitors the entire sequence of actions for a vehicle is described herein. Thus, it may be determined whether the vehicle complies with the entire VOSM (e.g., policies) and whether safety related parameters claimed by a vehicle manufacturer are consistent with the actual performance of the vehicle. To this end, performance parameters are collected during the test and evaluated against safety performance expectations as defined in a VOSM (e.g., RSS). In an example, the vehicle's behavior is monitored within a vehicle response time. In an example, the monitoring is performed by a testing device affixed to the test vehicle to record vehicle data during the test. The values recorded generally encompass periods before, during, and after a response time of the vehicle based on a dangerous situation. The real (e.g., measured versus represented by a manufacturer) performance parameters may then be used to measure compliance or indicate to what degree or in what situations the test vehicle does or does not comply with the VOSM.

By using the systems and techniques described herein, determinations as to whether the test vehicle performs as well as represented by a manufacturer. In an example, a third party test agent may use this information to verify whether the safety related parameters claimed by vehicle manufacturers are consistent with their actual performance and provide an authorized report on the safety performance evaluation. Such a safety report may be an important reference for the customers, regulators, or insurance providers, among others. For example, an insurance institute may use the report as a reference in calculating the insurance premiums for the specific types of vehicles. Additional details and examples are provided below.

FIG. 1 illustrates an example of a moving vehicle scenario demonstrating an autonomous vehicle operation safety model, according to an embodiment. As illustrated, an ego vehicle 105 shares the road with two target vehicles, the sedan 120 and the truck 125. Here, "ego vehicle" refers to the vehicle from which a certain perspective is obtained, and a target vehicle is a subject within that perspective. In later examples with respect to the other figures, the ego vehicle 105 is the test vehicle.

In general, a VOSM is a mathematical model for safety assurance during automatous driving. It formulates a set of safety standards, such as a minimum distance $d_{min}$ between vehicles to avoid collisions. Multiple parameters are used to calculate the formulation, such as response time ρ, minimum braking $a_{min,brake}$ and maximum acceleration $a_{max,brake}$ of the vehicle. If all requirements are satisfied, the vehicle passes the VOSM and is believed to be safe, otherwise the vehicle is not safe.

VOSMs may define a safe longitudinal distance 110 and a safe lateral distance 115 for the ego vehicle 105. These distances create a zone, shell, bubble, or shield around the ego vehicle 105, also illustrated around the sedan 120 and the truck 125. Generally, violation of these safe distances (e.g., intersection or overlap 130) indicates that the ego vehicle 105 is not safe and should take corrective action. Note that the intersection 130 need not result in a collision, merely that, according to RSS, an unsafe situation has arisen.

In an example, the VOSM may use the following representations of safe longitudinal and lateral distances respectively:

$$d_{min} = \left[ v_r \rho + \frac{1}{2} a_{max,accel} \rho^2 + \frac{(v_r + \rho a_{max,accel})^2}{2 a_{min,brake}} - \frac{v_f^2}{2 a_{max,brake}} \right]_+ \quad (1)$$

and $$d_{min} = \mu + \left[ \frac{2 v_1 + \rho_1 a_{1,max,accel}^{lat}}{2} \rho_1 + \frac{(v_1 + \rho_1 a_{1,max,accel}^{lat})^2}{2 a_{1,min,brake}^{lat}} - \right. \quad (2)$$
$$\left. \left( \frac{2 v_2 - \rho_2 a_{2,max,accel}^{lat}}{2} \rho_2 - \frac{(v_2 - \rho_2 a_{2,max,accel}^{lat})^2}{2 a_{2,min,brake}^{lat}} \right) \right]_+$$

With respect to the safe longitudinal distance of equation (1), $a_{max,accel}$ and $a_{min,brake}$ are the maximum acceleration rate and minimum braking rate of the ego vehicle 105 ($c_r$), and ρ is the response time of the ego vehicle 105. With respect to the safe lateral distance of equation (2), $\rho_1$ and $\rho_2$ are the response time of the ego vehicle 105 ($c_1$) and an ego vehicle ($c_2$) such as the truck 125. Also, $a_{1,max,accel}^{lat}$ and $a_{1,min,brake}^{lat}$ are respectively the maximum acceleration rate and minimum braking rate of $c_1$, $a_{2,max,accel}^{lat}$ and $a_{2,min,accel}^{lat}$ are respectively the maximum acceleration rate and minimum braking rate of $c_2$.

For clarity, the result from equation (1) is referred to as the minimum safe longitudinal distance and the result from equation (2) is referred to as the minimum safe lateral distance. When the ego vehicle detects that it is closer than either the minimum safe longitudinal distance or the minimum safe lateral distance, the ego vehicle 105 is expected to implement a corrective action. Such corrective actions may include braking or turning to increase the distance between the ego vehicle 105 and the truck 125 or other object until the minimum safe longitudinal distance and the minimum safe lateral distance are restored.

Equations (1) and (2) above illustrate the parameterization of the safety model to response times of the ego vehicle 105 and the truck 125, maximum lateral or longitudinal acceleration of the truck 125 and minimum braking (e.g., deceleration) of the ego vehicle 105. Here, maximum acceleration is the greatest acceleration capable by a vehicle and minimum braking is the deacceleration a vehicle can guarantee will be applied when executing a maneuver. Thus, if the vehicle is in peak operating condition, the maximum and minimum braking may be the same. However, if, for example, the ego vehicle 105 has worn brakes, the minimum braking for the ego vehicle 105 is reduced from the maximum braking based on the brake wear. Actual values used for the maximum and minimum or either braking or acceleration are generally defined by a manufacturer of the ego vehicle 105, or defined by the VOSM, among other places. These values are defined to provide a realistic safety margin given equations (1) and (2). It is noted that the equations (1) and (2) generally assume a worst case scenario in which the ego vehicle 105 is underperforming (thus the use of the minimum braking for the ego vehicle) and the truck 125 is at peak performance (thus the use of maximum acceleration for the truck 125) even though it is more likely that the ego vehicle 105 will outperform its minimum braking and the truck 125 will underperformed its maximum acceleration.

By using the equations (1) and (2), the danger zone is defined around the ego vehicle 105. As noted above, when another object interferes with this zone, or is projected to interfere with the zone, then the ego vehicle 105 is expected to act. Because the velocities of both the ego vehicle 105 and the truck 125 are parameters of equations (1) and (2), the danger zone is constantly changing based on the detected movement of the ego vehicle 105 and the truck 125. Entering the danger zone represents a dangerous situation for the ego vehicle 105.

In the context of vehicle following, the minimum longitudinal safe distance is defined by equation (1). Below is a version of equation (1):

$$d_{min}^{long} = \left[ v_r \rho + \frac{a_{max,accel}^{long} \rho^2}{2} + \frac{(v_r + \rho a_{max,accel}^{long})^2}{2 a_{min,brake}^{long}} - \frac{v_f^2}{2 a_{max,brake}^{long}} \right]_+$$

here the notation $[X]_+ = \max\{x, 0\}$, and where:
  $v_f$: longitudinal speed of the front vehicle 240;
  $a_{max,brake}^{long}$: the maximum braking acceleration of the front vehicle 240;
  $v_r$: the longitudinal speed of the test vehicle 205;
  ρ: the response time of the test vehicle 205;
  $a_{max,accel}^{long}$: the maximum forward acceleration of the test vehicle 205;
  $a_{min,brake}^{long}$: the minimum braking acceleration of the test vehicle 205.

When the distance between the test vehicle 205 and the front vehicle 240 equal or less than the minimum longitudinal safe distance, the test vehicle 205 should continue advancing with the acceleration no more than the maximum longitudinal acceleration ($a_{max,brake}^{long}$) during the response time, then the test vehicle should decelerate with the braking acceleration no less than the minimum longitudinal braking acceleration ($a_{min,brake}^{long}$) until the test vehicle 205 is completely stopped or the longitudinal dangerous situation is released (e.g., there is no more longitudinal dangerous situation).

Given the above, the testing systems and techniques described below measure the two different stages movement. The first stage is prior to the response time in which the test vehicle 205 is still accelerating. The second stage following the lapse of the response time in which the test vehicle 205 begins to deaccelerate. The measurements provide exact, within the limits of the testing sensors, values of VOSM parameters adopted by the manufacturer.

Figure 2:
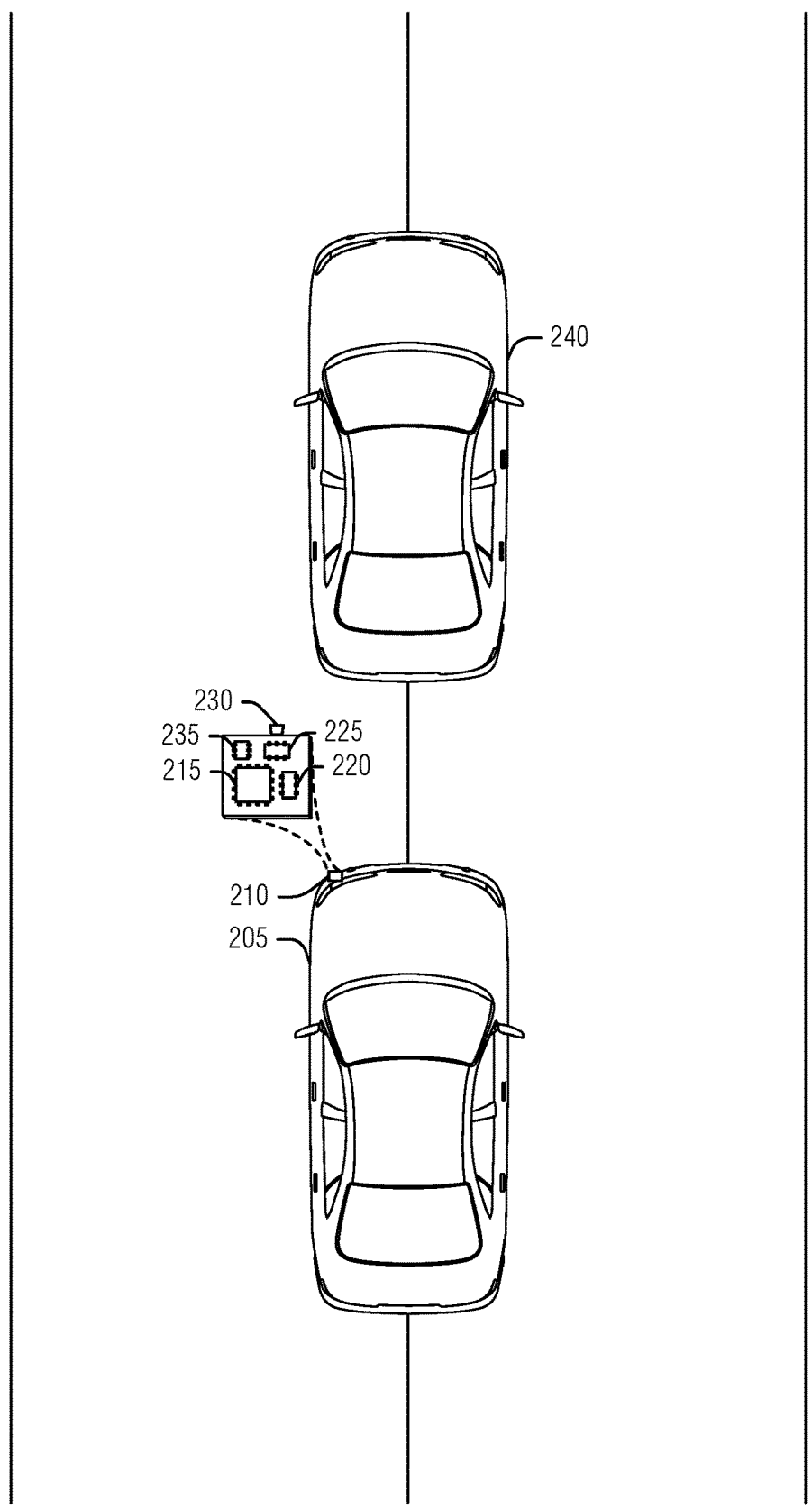
FIG. 2 illustrates a system for VOSM compliance measurement, according to an embodiment.

FIG. 2 illustrates a system 210 for VOSM compliance measurement, according to an embodiment. As illustrated, the system 210 is mounted to a test vehicle 205 and following a front vehicle 240. The system 210 includes processing circuitry 215 and memory 220. The memory 220 may be volatile or non-volatile memory and composed of a single device or several devices. The memory 220 provides storage of data or software. The processing circuitry 215 is hardwired, configured by software stored in the memory 220, or a combination thereof in order to perform the VOSM compliance measurements described below.

Figure 4:
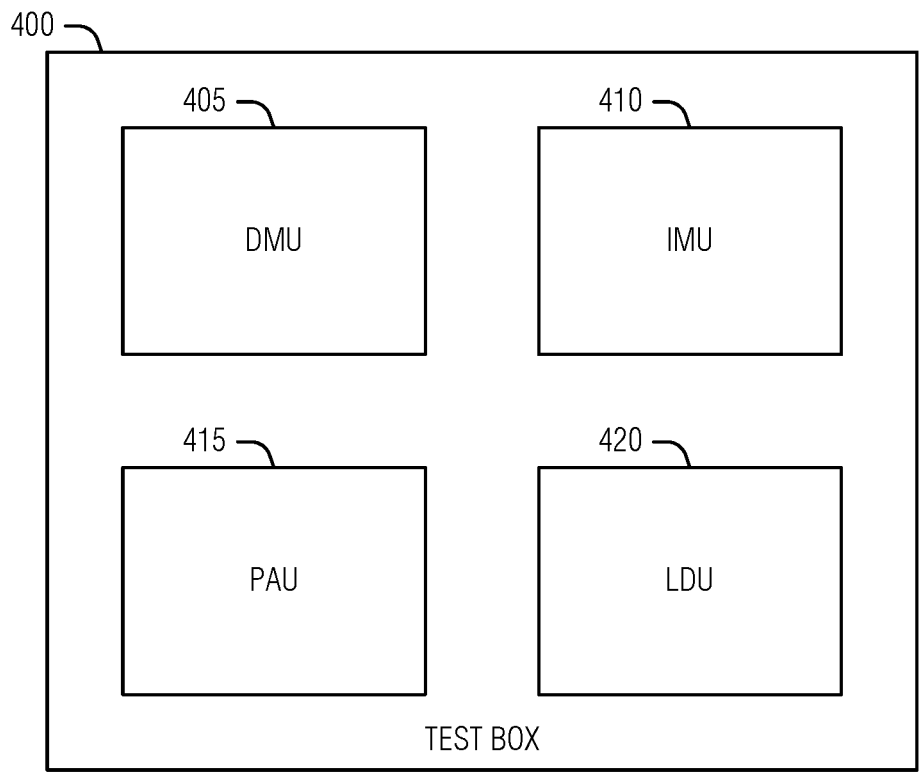
FIG. 4 illustrates example components of a test device for VOSM compliance measurement, according to an embodiment.

The system 210 also includes an interface 225 to obtain (e.g., receive or retrieve) data from sensors, such as the sensor 230. The system 210 is also illustrated with an internal sensor 235, such as a gyroscope, inertial sensor, etc. In an example, the external sensor 230 is photon based, such as a camera, lidar, radar, or the like. In an example, the external sensor 230 is sound based, such as an ultrasonic sensor. FIG. 4 provides additional examples of the hardware that may be used in the system 210.

The system 210 is illustrated in a housing mounted to the test vehicle 205. However, other arrangements may be used, such as a stationary test device that observes the interaction between the test vehicle 205 and the front vehicle 240 by, for example, camera, lidar, or radar. However, a vehicle mounted system may provide greater flexibility and accuracy for most use cases.

To perform VOSM compliance measurement, the processing circuitry is configured to measure a distance between the test vehicle 205 and front vehicle 240. The measurement may be performed by the external sensor 230 and provided to the processing circuitry, or directly by the processing circuitry 215 from raw data provided by the external sensor 230 and obtained via the interface 225. In an example, the measurement has a margin of error less than or equal to a tenth of a meter.

The processing circuitry 215 is configured to measure changes in acceleration of the test vehicle 205, for example, by the internal sensor 235 when the system 210 is mounted to the test vehicle 205. In an example, the changes in the acceleration of the test vehicle are measured a margin of error less than or equal to a tenth of a meter per second squared.

The measurements of the distance and the test vehicle acceleration are continuous throughout the test. Thus, the measurements are started when the test is started and terminated when the test is terminated, such as when both the test vehicle 205 and the front vehicle 240 are stopped as described below.

The processing circuitry 215 is configured to mark (e.g., record, save, etc.) a first time when the front vehicle 240 starts braking. This braking event is an inflexion point upon which the test vehicle 205 is being evaluated. The first time may be detected from the external sensor 230, or may be provided to the system 210 (e.g., wirelessly) from the front vehicle 240 or an external device controlled by the testing organization.

The velocity (e.g., speed) of the test vehicle 205 may be changed between tests to ascertain VOSM compliance in different operation scenarios. Thus, in an example, the test vehicle 205 may be at twenty percent, fifty percent, or eighty percent maximum velocity prior to the first time (braking event). Other factors that may be changed between tests include lighting (e.g., time of day), road surface type (e.g., paved, gravel, etc.), or agents upon the road surface (e.g., ice, oil, etc.).

The processing circuitry 215 is configured to detect that the test vehicle 205 enters a dangerous situation. As noted in FIG. 1, a dangerous situation occurs when the test vehicle 205 is the minimum safe distance as defined by the VOSM away from the front vehicle 240. The distance measurements (e.g., based on readings from the external sensor 230) provide the data upon which the dangerous situation is detected. Upon detection of the dangerous situation, the processing circuitry 215 is configured to mark a second time (dangerous situation time).

The processing circuitry 215 is configured to detect braking by the test vehicle 205, for example, from the changes in acceleration measured based on the data from the internal sensor 235. In an example, the braking in may be detected based upon a signal generated by a control system of the test vehicle 205. Upon detection of the braking by the test vehicle 205 a third time is marked. The difference between the second time—entering the dangerous situation—and this third time is the response time for the test vehicle 205. Thus, the response time is a duration between the initial action by the front vehicle 240 and the reaction by the test vehicle 205. In an example, the response time has a margin of error less than or equal to ten milliseconds. The error margin encompasses clock accuracy from the clock marking the various times herein, as well as processing latency for the various detections. Thus, to achieve the response time error margin, the accumulated errors or delays are less than or equal to ten milliseconds.

The processing circuitry 215 is configured to detect when the test vehicle 205 and the front vehicle 240 stop. Upon detecting the stop, the processing circuitry 215 is configured to mark a fourth time (stop time). In most cases, this is the termination of the test, or an iteration of the test. Subsequent iterations, for example to vary testing factors, will start by marking the first time and continuing as described above.

The processing circuitry 215 is configured to log the various test values. Here, logging means recording the test values in a data structure (e.g., log file, database, etc.) for archiving, retrieval, etc. In an example, the test values logged include the distance between the test vehicle and the front vehicle between the first time (braking event) and the fourth time (stop time). In an example, the test values logged include the response time (e.g., the difference between the dangerous situation being detected and braking by the test vehicle 205). In an example, the test values logged include acceleration of the test vehicle between the second time (entering the dangerous situation) and the second time plus the response time (also the third time or the time braking by the test vehicle 205 is detected). In an example, the test values logged include deceleration of the test vehicle between the second time plus the response time and the fourth time. In an example, the test values logged include the second time indicating that the test vehicle entered the dangerous situation.

The processing circuitry 215 is configured to calculate the maximum acceleration of the test vehicle during the response time. Here, the maximum acceleration means that there is no record of a greater positive acceleration within the period following the second time until the third time, which is during the response time. In an example, the maximum acceleration may be determined on-the-fly as the changes in acceleration are measured. In an example, the maximum acceleration may be determined from the logged measurements of the changes in acceleration.

The processing circuitry 215 is configured to calculate a minimum braking deceleration of the test vehicle after the response time. Thus, the minimum braking deceleration is the lowest magnitude deceleration measured after the third time. In an example, the minimum braking deceleration may be determined on-the-fly as the changes in acceleration are measured. In an example, the minimum braking deceleration may be determined from the logged measurements of the changes in acceleration.

The processing circuitry 215 is configured to produce (e.g., display, transmit, communicate, signal, etc.) a compliance measurement for the test vehicle 205. The compliance measurement is the result of comparing the values measured or calculated by the processing circuitry 215 during the test with a set of predefined values for the test vehicle 205. Generally, the predefined values are provided by a manufacturer of the test vehicle 205.

The test values compared to respective predefined values by the processing circuitry 215 include the distance between the test vehicle 205 and the front vehicle 240 between the first time and the fourth time, the response time, the maximum acceleration, and the minimum braking deceleration. In an example, the processing circuitry 215 is configured to indicate compliance for the response time in response to the response time being less than or equal ($\leq$) to a deviation caused by measurement instrument and a predefined response time. The deviation accounts for margins of error introduced by the system 210. In an example, if compliance is not indicated, the processing circuitry 215 is configured to recommend a change in vehicle operating parameters to address the shortcoming of the test vehicle 205. Such a change may include a greater trailing distance, increased sensor sensitivity, etc.

In an example, the processing circuitry is configured to indicate compliance for the maximum acceleration in response to the maximum acceleration being less than or equal ($\leq$) to a deviation caused by a road surface and (+) a predefined maximum acceleration. Here, the deviation for the road surface addresses road types (e.g., gravel or paved) or road condition (e.g., wet, iced, etc.). In an example, the processing circuitry is configured to indicate compliance for the minimum braking deceleration acceleration in response to a predefined minimum braking deceleration plus (+) a first deviation caused by a road surface under braking being less than or equal ($\leq$) to the minimum braking deceleration being less than or equal ($\leq$) to a predefined maximum acceleration plus (+) a second deviation cause by the road surface under acceleration. This example notes that the road surface deviation may vary between acceleration and deceleration. In an example, the processing circuitry is configured to indicate compliance for the distance between the test vehicle 205 and the front vehicle 240 between the first time and the fourth time in response to the distance between the test vehicle 205 and the front vehicle 240 being greater than or equal ($\geq$) to a predefined safe distance margin in the predefined values.

Figure 3:
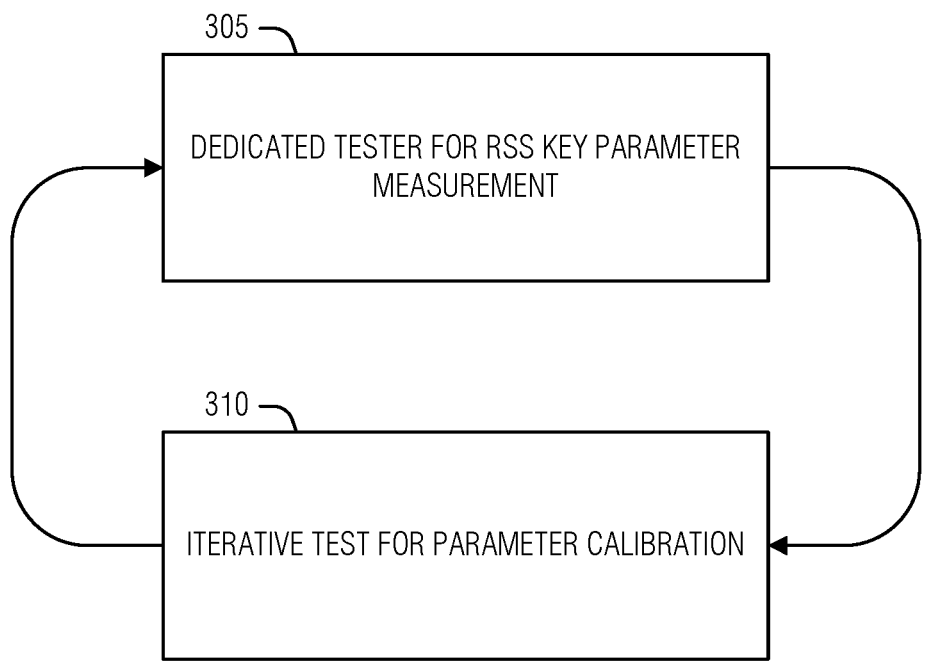
FIG. 3 illustrates an example of an architecture for VOSM compliance measurement, according to an embodiment.

FIG. 3 illustrates an example of an architecture for VOSM compliance measurement, according to an embodiment. The illustrated architecture includes a test device 305 (e.g., test system, test package, sensor package, etc.)—such as test device 400 described below—and an iterative test processor 310. The test device 305 is configured to directly measures key parameters used by the VOSM, such as a vehicle's response time $\rho$, maximum longitudinal acceleration ($a_{max,brake}^{long}$) or minimum longitudinal braking acceleration ($a_{min,brake}^{long}$). The test device 305 accordingly includes hardware or software configured to obtain values for the relevant VOSM parameters.

The iterative test processor 310 is configured to receive results from the test device 305 and compare the received results with compliance values, such as value represented by a manufacture to reflect the performance of the test vehicle. In an example, if the actual behavior of the test vehicle is different than the expected behavior—e.g., if the measured value deviates from that represented by a manufacture—the iterative test processor 310 is configured to vary one or more testing parameters for future iterations of the test. Thus, for example, the tested vehicle speed (e.g., velocity, acceleration, or braking) or initial distance between vehicles may be iteratively changed until the expected value coincides with the tested value of the parameters. This enables a determination under what conditions the manufacturer represented performance of the test vehicle is valid.

FIG. 4 illustrates example components of a test device 400 for VOSM compliance measurement, according to an embodiment. These components may be packaged together as a dedicated tester as described above. Generally, for longitudinal testing, the test device 400 (e.g., test box) will be affixed to a front bumper of a test vehicle. As illustrated, the dedicated tester includes at least four components, a distance measurement unit (DMU) 405, an inertial measurement unit (IMU) 410, a parameter analysis unit (PAU) 415, and a log display unit (LDU) 420.

The DMU 405 includes sensors to detect distance between the test vehicle and a leading vehicle. Thus, the DMU 405 may include radar, lidar, or an image-based distance measurement sensor.

The IMU 410 includes sensors to measure the movement (e.g., acceleration or deceleration) of the test vehicle, usually in real time. Generally, the IMU 410 sensor package will include one or more accelerometers, and may also use a satellite positioning system, or terrestrial positioning system.

The PAU 415 includes interfaces to receive the output from the DMU 405 and the IMU 410, as well as an accurate clock (e.g., with resolution in the milliseconds) in order to correlate the data in time. The PAU 415 also includes processing circuitry to implement response time calculations or other data processing. The following is an example of processing that may be performed by the processing circuitry of the PAU 415:

1. Let the detected distance—as measured by the DMU 405—be $d_0$. When $d_0 \leq d_{min}^{long}$, the PAU 415 is configured to trigger the timer (e.g., internal clock) to start counting while reading output from the IMU 410 for displacement and acceleration analysis.
2. When the acceleration value becomes negative the vehicle has begun to brake. Here, the PAU 415 triggers to the timer to stop counting and reads the timer value back for the response time $\rho_{real}$ calculation. At this time, the PAU 415 calculates the displacement value $d_1$ and the maximum acceleration $a_{real,max,accel}^{long}$ during this period.
3. The PAU 415 continues to read the acceleration value from IMU 410 until the test vehicle stops, finding the minimum braking acceleration $a_{real,min,brake}^{long}$ this period, as well as the displacement $d_2$ during this period.
4. The PAU 415 then provides (e.g., outputs) the values for $\rho_{real}$, $a_{real,max,accel}^{long}$, $a_{real,min,brake}^{long}$, $d_1$, $d_2$ to the LDU.

The LDU 420 includes a display, or a transmission interface (e.g., transmitter, network interface, etc.) to output the key VOSM parameter values in a given cycle of a test. In an example, The LDU 420 includes storage to hold outputs of an iteration of the test until the LDU 420 is able to display them or transfer them.

Figure 5:
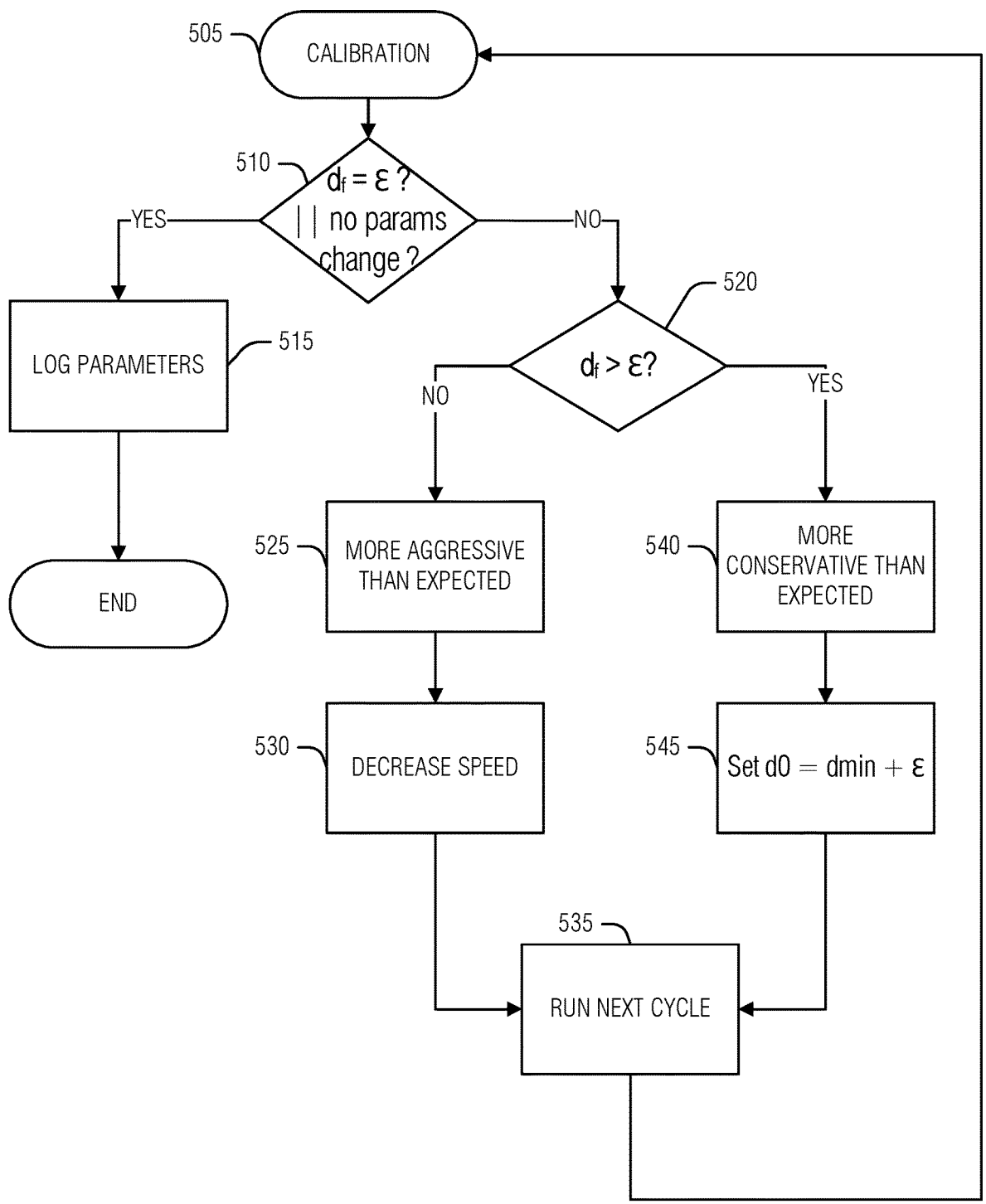
FIG. 5 illustrates an example of a process flow for VOSM compliance measurement, according to an embodiment.

FIG. 5 illustrates an example of a process flow for VOSM compliance measurement, according to an embodiment. Again, to determine whether a test vehicle complies the VOSM safety requirements and whether the actual values of parameters are consistent with those claimed, the illustrated test procedure may be used.

The initial distance between two vehicles $d_0=d_{min}^{long}+\varepsilon$ is set. Here $\varepsilon$ is a safety margin whose value depends on environmental conditions, such as road type, weather, or speed. Considering equation (1), the braking distance of the front vehicle, $$\frac{v_f^2}{2a_{max,brake}^{long}},$$

may be set as an environmental input. With the value of $\rho$, $a_{max,accel}^{long}$, and $a_{min,brake}^{long}$—e.g., provided by the manufacturers—the value of the minimum longitudinal safe distance $d_{min}^{long}$ when the test vehicle is driving at a certain speed may be obtained.

When the test vehicle complies with the VOSM—during the response time, $a_{real,accel}^{long}=a_{max,accel}^{long}$ and $\rho_{real}=\rho$, and after the response time, $a_{real,brake}^{long}=a_{max,brake}^{long}$—the final distance will be $\varepsilon$ when two vehicles are fully stopped. If the final distance dr is equal to $\varepsilon$ (decision 510), then the parameters are logged (operation 515) and the test ends. If the final distance dr is not equal to $\varepsilon$(decision 510). A calibration 505 is performed. Specifically, the calibration may include adjusting one or more of the environmental inputs until the real value of $\rho_{real}$, $a_{real,max,accel}^{long}$ and $a_{real,min,brake}^{long}$ are measured. The adjustments may proceed as illustrated, where, if the value $d_f$ is less that $\epsilon$ (decision 520), then the speed ($v_f^2$) is decreased (operation 530) because the actual driving strategy is more aggressive than expected (determination 525). Conversely, if $d_f$ is greater that $\epsilon$ (decision 520), then the driving strategy is more conservative (determination 540) than expected, and the following vehicle is placed closer to the leading vehicle (operation 545). Once the adjustments are made, a next iteration is performed (operation 535).

Figure 6:
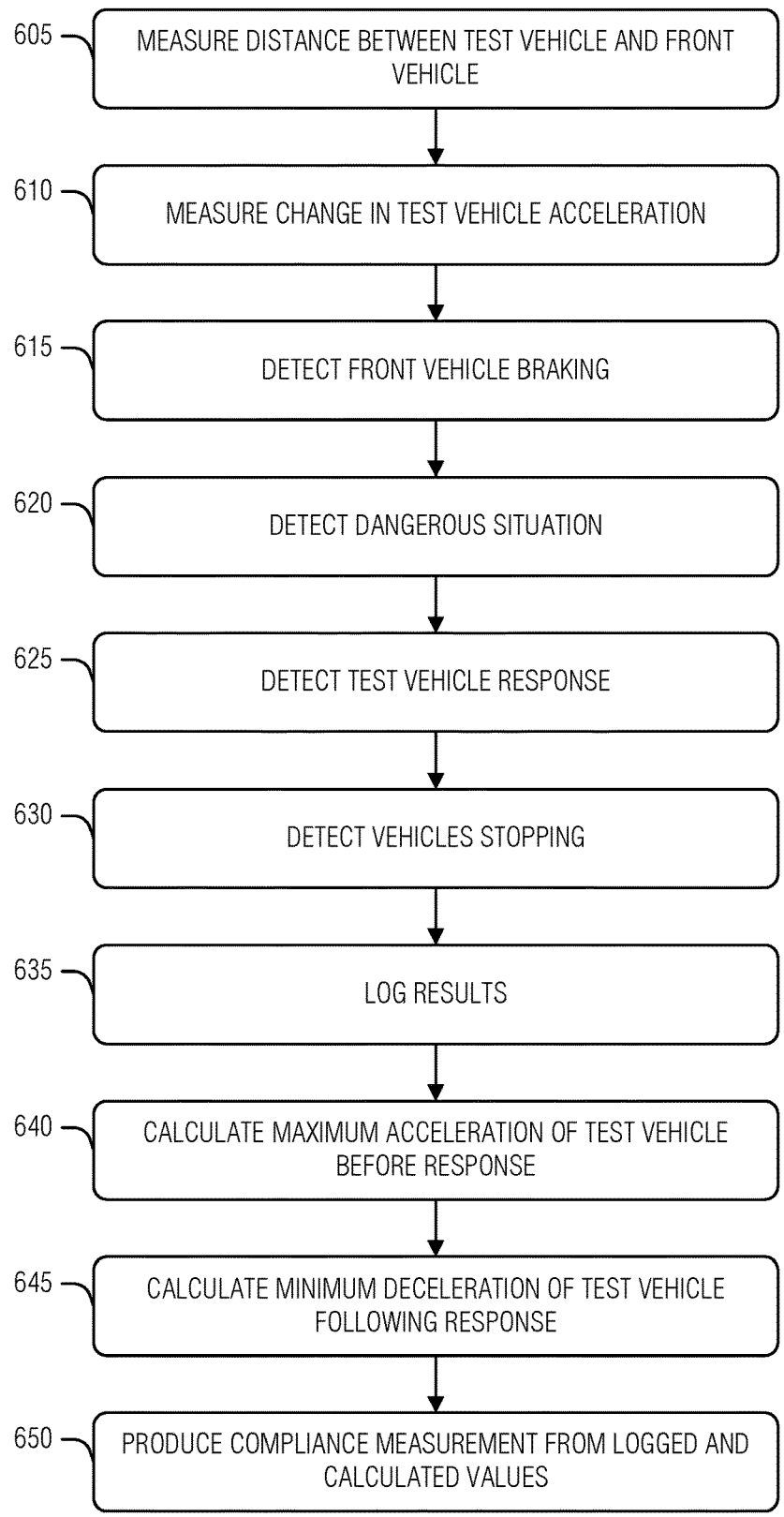
FIG. 6 illustrates an example of a method for VOSM compliance measurement, according to an embodiment.

FIG. 6 illustrates an example of a method 600 for VOSM compliance measurement, according to an embodiment. The operations of the method 600 are implemented in computer hardware, such as that described above or below (e.g., processing circuitry).

At operation 605, a distance between a test vehicle and a front vehicle is measured. Here, the measurement is performed when the test vehicle and the front vehicle are moving, and the test vehicle is following the front vehicle. In an example, the measurement is performed by a sensor with a margin of error less than or equal to a tenth of a meter.

At operation 610, changes in acceleration of the test vehicle are measured. In an example, the changes in the acceleration of the test vehicle are measured by a sensor with a margin of error less than or equal to a tenth of a meter per second squared.

At operation 615, a first time is marked (e.g., recorded) in response to braking by the front vehicle. In an example, the test vehicle is at twenty percent maximum velocity prior to the first time. In an example, the test vehicle is at fifty percent maximum velocity prior to the first time. In an example, the test vehicle is at eighty percent maximum velocity prior to the first time. In an example, the test vehicle and the front vehicle are at a constant speed prior to the first time. In an example, the test vehicle is at maximum acceleration at the first time.

At operation 620, the test vehicle entering a dangerous situation is detected from the distance between the test vehicle and the front vehicle. Here, the dangerous situation occurs when the distance between the test vehicle and the front vehicle is equal to a minimum safe distance as defined by the VOSM. Upon detection of the dangerous situation, a second time is marked.

At operation 625, braking by the test vehicle is detected from the changes in acceleration of the test vehicle. Upon detection of the braking by the test vehicle a third time is marked. The difference between the second time (operation 320) and this third time is the response time for the test vehicle. In an example, the response time has a margin of error less than or equal to ten milliseconds.

At operation 630, a stop by the test vehicle and the front vehicle is detected to mark a fourth time. This fourth time is the conclusion of this iteration of the test. The measurements from operations 605 and 610 are generally performed up to this point.

At operation 635, various test values are logged. For example, logging includes the distance between the test vehicle and the front vehicle between the first time (operation 615) and the fourth time (operation 630), the response time (operation 625), acceleration—from the changes in acceleration of the test vehicle (operation 610)—of the test vehicle between the second time (operation 620) and the second time plus the response time, or deceleration—from the changes in acceleration of the test vehicle—of the test vehicle between the second time plus the response time and the fourth time. In an example, the logging includes logging the second time indicating that the test vehicle entered the dangerous situation.

At operation 640, a maximum acceleration of the test vehicle during the response time is calculated, for example, from the logged test values.

At operation 645, a minimum braking deceleration of the test vehicle after the response time is calculated, for example, from the logged test values.

At operation 650, a compliance measurement is produced for the test vehicle by comparing the distance between the test vehicle and the front vehicle between the first time and the fourth time, the response time, the maximum acceleration, and the minimum braking deceleration to respective predefined values. In an example, producing the compliance measurement for the response time includes indicating compliance for the response time in response to the response time being less than or equal to a deviation caused by measurement instrument and a predefined response time in the predefined values. In an example, producing the compliance measurement for the maximum acceleration includes indicating compliance for the maximum acceleration in response to the maximum acceleration being less than or equal to a deviation caused by a road surface and a predefined maximum acceleration in the predefined values. In an example, producing the compliance measurement for the minimum braking deceleration acceleration includes indicating compliance in response to a predefined minimum braking deceleration plus a first deviation caused by a road surface under braking being less than or equal to the minimum braking deceleration being less than or equal to a predefined maximum acceleration plus a second deviation cause by the road surface under acceleration, the predefined minimum braking deceleration and the predefined maximum acceleration being in the predefined values. In an example, producing the compliance measurement for the distance between the test vehicle and the front vehicle between the first time and the fourth time includes indicating compliance for the distance between the test vehicle and the front vehicle between the first time and the fourth time in response to the distance between the test vehicle and the front vehicle between the first time and the fourth time being greater than or equal to a predefined safe distance margin in the predefined values.

Figure 7:
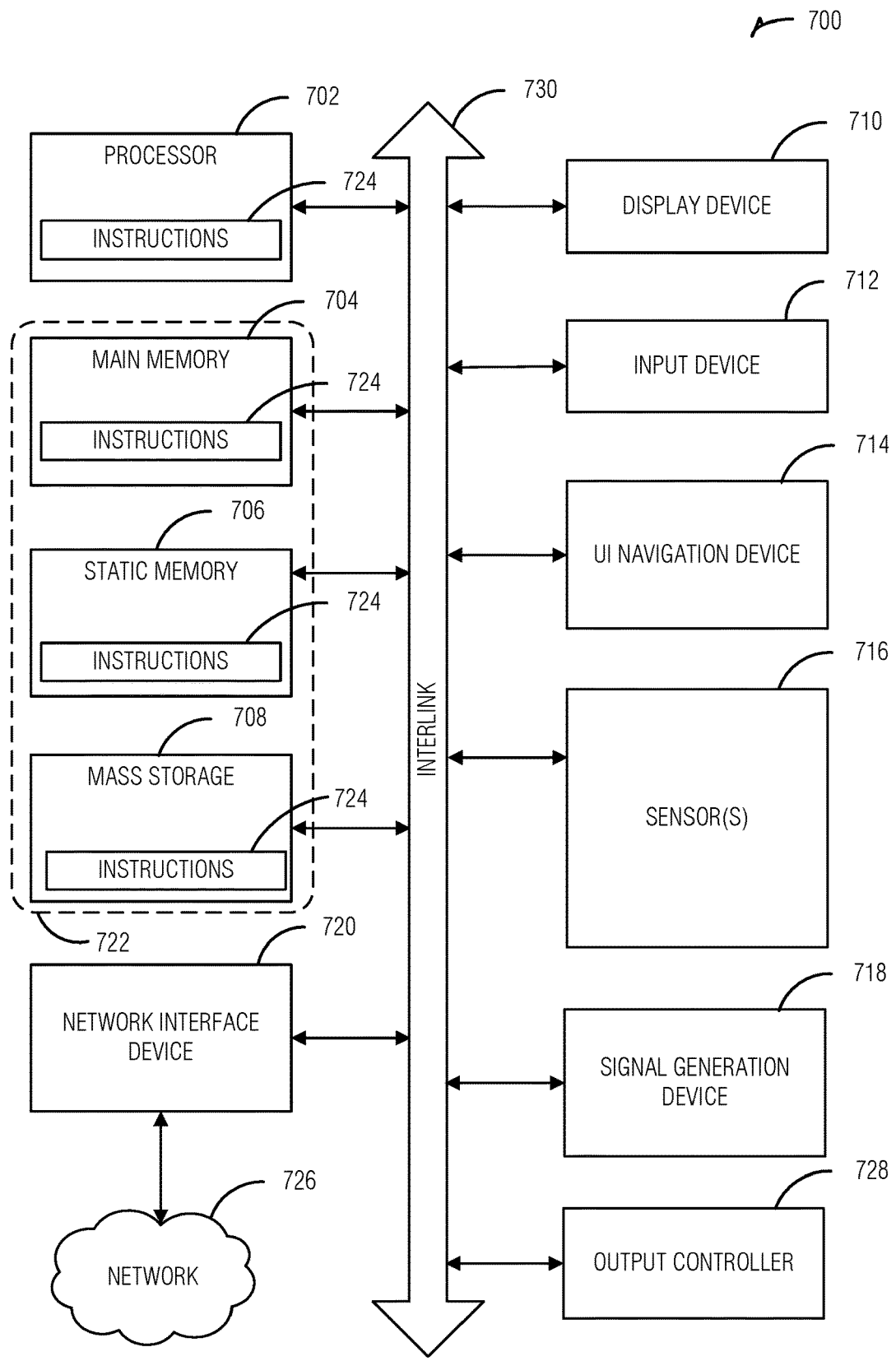
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. Examples, as described herein, may include, or may operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 may include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drives, tape drives, flash storage, or other block devices) some or all of which may communicate with each other via an interlink (e.g., bus) 730. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 708, a signal generation device 718 (e.g., a speaker), a network interface device 720, and one or more sensors 716, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 may be, or include, a machine readable medium 722 on which is stored one or more sets of data structures or instructions 724 (e.g., software) embodying or utilized by any one or more of the techniques or functions described herein. The instructions 724 may also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 may constitute the machine readable media 722. While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 722 may be representative of the instructions 724, such as instructions 724 themselves or a format from which the instructions 724 may be derived. This format from which the instructions 724 may be derived may include source code, encoded instructions (e.g., in compressed or encrypted form), packaged instructions (e.g., split into multiple packages), or the like. The information representative of the instructions 724 in the machine readable medium 722 may be processed by processing circuitry into the instructions to implement any of the operations discussed herein. For example, deriving the instructions 724 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 724.

In an example, the derivation of the instructions 724 may include assembly, compilation, or interpretation of the information (e.g., by the processing circuitry) to create the instructions 724 from some intermediate or preprocessed format provided by the machine readable medium 722. The information, when provided in multiple parts, may be combined, unpacked, and modified to create the instructions 724. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 724 may be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

Additional Notes & Examples

Example 1 is an apparatus for vehicle operation safety model compliance measurement, the apparatus comprising: an interface to receive data from an external sensor; an internal sensor to measure changes in acceleration; and processing circuitry configured to: measure, from data produced by the external sensor, a distance between a test vehicle and a front vehicle when the test vehicle and the front vehicle are in motion and the test vehicle is following the front vehicle; measure, using the internal sensor, changes in acceleration of the test vehicle; mark a first time in response to braking by the front vehicle; detect, from the distance between the test vehicle and the front vehicle, that the test vehicle has entered a dangerous situation, the dangerous situation occurring when the distance between the test vehicle and the front vehicle is less than or equal to a minimum safe distance as defined by the vehicle operation safety model to mark a second time; detect, from the changes in acceleration of the test vehicle, braking by the test vehicle to mark a third time, a difference between the second time and the third time being a response time for the test vehicle; detect a stop by the test vehicle and the front vehicle to mark a fourth time; write to a log: the distance between the test vehicle and the front vehicle between the first time and the fourth time; the response time; acceleration, from the changes in acceleration of the test vehicle, of the test vehicle between the second time and the second time plus the response time; and deceleration, from the changes in acceleration of the test vehicle, of the test vehicle between the second time plus the response time and the fourth time; calculate, using data from the log, a maximum acceleration of the test vehicle during the response time; calculate, using data from the log, a minimum braking deceleration of the test vehicle after the response time; and produce a compliance measurement for the test vehicle by comparing the distance between the test vehicle and the front vehicle between the first time and the fourth time, the response time, the maximum acceleration, and the minimum braking deceleration to respective predefined values.

In Example 2, the subject matter of Example 1, wherein the processing circuitry is configured to write the second time indicating that the test vehicle entered the dangerous situation to the log.

In Example 3, the subject matter of Example 2, wherein, to produce the compliance measurement for the distance between the test vehicle and the front vehicle between the first time and the fourth time, the processing circuitry is configured to: indicate compliance for the distance between the test vehicle and the front vehicle between the first time and the fourth time in response to the distance between the test vehicle and the front vehicle between the first time and the fourth time being greater than or equal to a predefined safe distance margin in the predefined values.

In Example 4, the subject matter of any of Examples 1-3, wherein, to produce the compliance measurement for the response time, the processing circuitry is configured to: indicate compliance for the response time in response to the response time being less than or equal to a deviation caused by measurement instrument and a predefined response time in the predefined values.

In Example 5, the subject matter of any of Examples 1-4, wherein, to produce the compliance measurement for the maximum acceleration, the processing circuitry is configured to: indicate compliance for the maximum acceleration in response to the maximum acceleration being less than or equal to a deviation caused by a road surface and a predefined maximum acceleration in the predefined values.

In Example 6, the subject matter of any of Examples 1-5, wherein, to produce the compliance measurement for the minimum braking deceleration, the processing circuitry is configured to: indicate compliance in response to a predefined minimum braking deceleration plus a first deviation caused by a road surface under braking being less than or equal to the minimum braking deceleration being less than or equal to a predefined maximum acceleration plus a second deviation cause by the road surface under acceleration, the predefined minimum braking deceleration and the predefined maximum acceleration being in the predefined values.

In Example 7, the subject matter of any of Examples 1-6, wherein the test vehicle is at twenty percent maximum velocity prior to the first time.

In Example 8, the subject matter of any of Examples 1-7, wherein the test vehicle is at fifty percent maximum velocity prior to the first time.

In Example 9, the subject matter of any of Examples 1-8, wherein the test vehicle is at eighty percent maximum velocity prior to the first time.

In Example 10, the subject matter of any of Examples 1-9, wherein the test vehicle and the front vehicle are at a constant speed prior to the first time.

In Example 11, the subject matter of any of Examples 1-10, wherein the test vehicle is at maximum acceleration at the first time.

In Example 12, the subject matter of any of Examples 1-11, wherein the distance between the test vehicle and the front vehicle when the test vehicle and the front vehicle are moving with the test vehicle following the front vehicle is measured by a sensor with a margin of error less than or equal to a tenth of a meter.

In Example 13, the subject matter of any of Examples 1-12, wherein the changes in the acceleration of the test vehicle are measured by a sensor with a margin of error less than or equal to a tenth of a meter per second squared.

In Example 14, the subject matter of any of Examples 1-13, wherein the response time has a margin of error less than or equal to ten milliseconds.

Example 15 is a method for vehicle operation safety model compliance measurement, the method comprising: measuring a distance between a test vehicle and a front vehicle when the test vehicle and the front vehicle are in motion and the test vehicle is following the front vehicle; measuring changes in acceleration of the test vehicle; marking a first time in response to braking by the front vehicle; detecting, from the distance between the test vehicle and the front vehicle, that the test vehicle has entered a dangerous situation, the dangerous situation occurring when the distance between the test vehicle and the front vehicle is less than or equal to a minimum safe distance as defined by the vehicle operation safety model to mark a second time; detecting, from the changes in acceleration of the test vehicle, braking by the test vehicle to mark a third time, a difference between the second time and the third time being a response time for the test vehicle; detecting a stop by the test vehicle and the front vehicle to mark a fourth time; logging: the distance between the test vehicle and the front vehicle between the first time and the fourth time; the response time; acceleration, from the changes in acceleration of the test vehicle, of the test vehicle between the second time and the second time plus the response time; and deceleration, from the changes in acceleration of the test vehicle, of the test vehicle between the second time plus the response time and the fourth time; calculating, from the logging, a maximum acceleration of the test vehicle during the response time; calculating, from the logging, a minimum braking deceleration of the test vehicle after the response time; and producing a compliance measurement for the test vehicle by comparing the distance between the test vehicle and the front vehicle between the first time and the fourth time, the response time, the maximum acceleration, and the minimum braking deceleration to respective predefined values.

In Example 16, the subject matter of Example 15, wherein the logging includes logging the second time indicating that the test vehicle entered the dangerous situation.

In Example 17, the subject matter of Example 16, wherein producing the compliance measurement for the distance between the test vehicle and the front vehicle between the first time and the fourth time includes: indicating compliance for the distance between the test vehicle and the front vehicle between the first time and the fourth time in response to the distance between the test vehicle and the front vehicle between the first time and the fourth time being greater than or equal to a predefined safe distance margin in the predefined values.

In Example 18, the subject matter of any of Examples 15-17, wherein producing the compliance measurement for the response time includes: indicating compliance for the response time in response to the response time being less than or equal to a deviation caused by measurement instrument and a predefined response time in the predefined values.

In Example 19, the subject matter of any of Examples 15-18, wherein producing the compliance measurement for the maximum acceleration includes: indicating compliance for the maximum acceleration in response to the maximum acceleration being less than or equal to a deviation caused by a road surface and a predefined maximum acceleration in the predefined values.

In Example 20, the subject matter of any of Examples 15-19, wherein producing the compliance measurement for the minimum braking deceleration includes: indicating compliance in response to a predefined minimum braking deceleration plus a first deviation caused by a road surface under braking being less than or equal to the minimum braking deceleration being less than or equal to a predefined maximum acceleration plus a second deviation cause by the road surface under acceleration, the predefined minimum braking deceleration and the predefined maximum acceleration being in the predefined values.

In Example 21, the subject matter of any of Examples 15-20, wherein the test vehicle is at twenty percent maximum velocity prior to the first time.

In Example 22, the subject matter of any of Examples 15-21, wherein the test vehicle is at fifty percent maximum velocity prior to the first time.

In Example 23, the subject matter of any of Examples 15-22, wherein the test vehicle is at eighty percent maximum velocity prior to the first time.

In Example 24, the subject matter of any of Examples 15-23, wherein the test vehicle and the front vehicle are at a constant speed prior to the first time.

In Example 25, the subject matter of any of Examples 15-24, wherein the test vehicle is at maximum acceleration at the first time.

In Example 26, the subject matter of any of Examples 15-25, wherein the distance between the test vehicle and the front vehicle when the test vehicle and the front vehicle are moving with the test vehicle following the front vehicle is measured by a sensor with a margin of error less than or equal to a tenth of a meter.

In Example 27, the subject matter of any of Examples 15-26, wherein the changes in the acceleration of the test vehicle are measured by a sensor with a margin of error less than or equal to a tenth of a meter per second squared.

In Example 28, the subject matter of any of Examples 15-27, wherein the response time has a margin of error less than or equal to ten milliseconds.

Example 29 is a machine readable medium including instructions for vehicle operation safety model compliance measurement, the instructions, when executed by processing circuitry, cause the processing circuitry to perform operations comprising: measuring a distance between a test vehicle and a front vehicle when the test vehicle and the front vehicle are in motion and the test vehicle is following the front vehicle; measuring changes in acceleration of the test vehicle; marking a first time in response to braking by the front vehicle; detecting, from the distance between the test vehicle and the front vehicle, that the test vehicle has entered a dangerous situation, the dangerous situation occurring when the distance between the test vehicle and the front vehicle is less than or equal to a minimum safe distance as defined by the vehicle operation safety model to mark a second time; detecting, from the changes in acceleration of the test vehicle, braking by the test vehicle to mark a third time, a difference between the second time and the third time being a response time for the test vehicle; detecting a stop by the test vehicle and the front vehicle to mark a fourth time; logging: the distance between the test vehicle and the front vehicle between the first time and the fourth time; the response time; acceleration, from the changes in acceleration of the test vehicle, of the test vehicle between the second time and the second time plus the response time; and deceleration, from the changes in acceleration of the test vehicle, of the test vehicle between the second time plus the response time and the fourth time; calculating, from the logging, a maximum acceleration of the test vehicle during the response time; calculating, from the logging, a minimum braking deceleration of the test vehicle after the response time; and producing a compliance measurement for the test vehicle by comparing the distance between the test vehicle and the front vehicle between the first time and the fourth time, the response time, the maximum acceleration, and the minimum braking deceleration to respective predefined values.

In Example 30, the subject matter of Example 29, wherein the logging includes logging the second time indicating that the test vehicle entered the dangerous situation.

In Example 31, the subject matter of Example 30, wherein producing the compliance measurement for the distance between the test vehicle and the front vehicle between the first time and the fourth time includes: indicating compliance for the distance between the test vehicle and the front vehicle between the first time and the fourth time in response to the distance between the test vehicle and the front vehicle between the first time and the fourth time being greater than or equal to a predefined safe distance margin in the predefined values.

In Example 32, the subject matter of any of Examples 29-31, wherein producing the compliance measurement for the response time includes: indicating compliance for the response time in response to the response time being less than or equal to a deviation caused by measurement instrument and a predefined response time in the predefined values.

In Example 33, the subject matter of any of Examples 29-32, wherein producing the compliance measurement for the maximum acceleration includes: indicating compliance for the maximum acceleration in response to the maximum acceleration being less than or equal to a deviation caused by a road surface and a predefined maximum acceleration in the predefined values.

In Example 34, the subject matter of any of Examples 29-33, wherein producing the compliance measurement for the minimum braking deceleration includes: indicating compliance in response to a predefined minimum braking deceleration plus a first deviation caused by a road surface under braking being less than or equal to the minimum braking deceleration being less than or equal to a predefined maximum acceleration plus a second deviation cause by the road surface under acceleration, the predefined minimum braking deceleration and the predefined maximum acceleration being in the predefined values.

In Example 35, the subject matter of any of Examples 29-34, wherein the test vehicle is at twenty percent maximum velocity prior to the first time.

In Example 36, the subject matter of any of Examples 29-35, wherein the test vehicle is at fifty percent maximum velocity prior to the first time.

In Example 37, the subject matter of any of Examples 29-36, wherein the test vehicle is at eighty percent maximum velocity prior to the first time.

In Example 38, the subject matter of any of Examples 29-37, wherein the test vehicle and the front vehicle are at a constant speed prior to the first time.

In Example 39, the subject matter of any of Examples 29-38, wherein the test vehicle is at maximum acceleration at the first time.

In Example 40, the subject matter of any of Examples 29-39, wherein the distance between the test vehicle and the front vehicle when the test vehicle and the front vehicle are moving with the test vehicle following the front vehicle is measured by a sensor with a margin of error less than or equal to a tenth of a meter.

In Example 41, the subject matter of any of Examples 29-40, wherein the changes in the acceleration of the test vehicle are measured by a sensor with a margin of error less than or equal to a tenth of a meter per second squared.

In Example 42, the subject matter of any of Examples 29-41, wherein the response time has a margin of error less than or equal to ten milliseconds.

Example 43 is a system for vehicle operation safety model compliance measurement, the system comprising: means for measuring a distance between a test vehicle and a front vehicle when the test vehicle and the front vehicle are in motion and the test vehicle is following the front vehicle; means for measuring changes in acceleration of the test vehicle; means for marking a first time in response to braking by the front vehicle; means for detecting, from the distance between the test vehicle and the front vehicle, that the test vehicle has entered a dangerous situation, the dangerous situation occurring when the distance between the test vehicle and the front vehicle is less than or equal to a minimum safe distance as defined by the vehicle operation safety model to mark a second time; means for detecting, from the changes in acceleration of the test vehicle, braking by the test vehicle to mark a third time, a difference between the second time and the third time being a response time for the test vehicle; detecting a stop by the test vehicle and the front vehicle to mark a fourth time; means for logging: the distance between the test vehicle and the front vehicle between the first time and the fourth time; the response time; acceleration, from the changes in acceleration of the test vehicle, of the test vehicle between the second time and the second time plus the response time; and deceleration, from the changes in acceleration of the test vehicle, of the test vehicle between the second time plus the response time and the fourth time; means for calculating, from the logging, a maximum acceleration of the test vehicle during the response time; means for calculating, from the logging, a minimum braking deceleration of the test vehicle after the response time; and means for producing a compliance measurement for the test vehicle by comparing the distance between the test vehicle and the front vehicle between the first time and the fourth time, the response time, the maximum acceleration, and the minimum braking deceleration to respective predefined values.

In Example 44, the subject matter of Example 43, wherein the means for logging include means for logging the second time indicating that the test vehicle entered the dangerous situation.

In Example 45, the subject matter of Example 44, wherein the means for producing the compliance measurement for the distance between the test vehicle and the front vehicle between the first time and the fourth time include: means for indicating compliance for the distance between the test vehicle and the front vehicle between the first time and the fourth time in response to the distance between the test vehicle and the front vehicle between the first time and the fourth time being greater than or equal to a predefined safe distance margin in the predefined values.

In Example 46, the subject matter of any of Examples 43-45, wherein the means for producing the compliance measurement for the response time include: means for indicating compliance for the response time in response to the response time being less than or equal to a deviation caused by measurement instrument and a predefined response time in the predefined values.

In Example 47, the subject matter of any of Examples 43-46, wherein the means for producing the compliance measurement for the maximum acceleration include: means for indicating compliance for the maximum acceleration in response to the maximum acceleration being less than or equal to a deviation caused by a road surface and a predefined maximum acceleration in the predefined values.

In Example 48, the subject matter of any of Examples 43-47, wherein the means for producing the compliance measurement for the minimum braking deceleration include: means for indicating compliance in response to a predefined minimum braking deceleration plus a first deviation caused by a road surface under braking being less than or equal to the minimum braking deceleration being less than or equal to a predefined maximum acceleration plus a second deviation cause by the road surface under acceleration, the predefined minimum braking deceleration and the predefined maximum acceleration being in the predefined values.

In Example 49, the subject matter of any of Examples 43-48, wherein the test vehicle is at twenty percent maximum velocity prior to the first time.

In Example 50, the subject matter of any of Examples 43-49, wherein the test vehicle is at fifty percent maximum velocity prior to the first time.

In Example 51, the subject matter of any of Examples 43-50, wherein the test vehicle is at eighty percent maximum velocity prior to the first time.

In Example 52, the subject matter of any of Examples 43-51, wherein the test vehicle and the front vehicle are at a constant speed prior to the first time.

In Example 53, the subject matter of any of Examples 43-52, wherein the test vehicle is at maximum acceleration at the first time.

In Example 54, the subject matter of any of Examples 43-53, wherein the distance between the test vehicle and the front vehicle when the test vehicle and the front vehicle are moving with the test vehicle following the front vehicle is measured by a sensor with a margin of error less than or equal to a tenth of a meter.

In Example 55, the subject matter of any of Examples 43-54, wherein the changes in the acceleration of the test vehicle are measured by a sensor with a margin of error less than or equal to a tenth of a meter per second squared.

In Example 56, the subject matter of any of Examples 43-55, wherein the response time has a margin of error less than or equal to ten milliseconds.

PNUMExample 57 is at least one machine-readable medium including instructions that, when executed by processing circuitry, cause the processing circuitry to perform operations to implement of any of Examples 1-56.

PNUMExample 58 is an apparatus comprising means to implement of any of Examples 1-56.

PNUMExample 59 is a system to implement of any of Examples 1-56.

PNUMExample 60 is a method to implement of any of Examples 1-56.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. An apparatus for vehicle operation safety model compliance measurement, the apparatus comprising:
    an interface to receive data from an external sensor;
    an internal sensor to measure changes in acceleration; and
    processing circuitry configured to:
        measure, from data produced by the external sensor, a distance between a test vehicle and a front vehicle when the test vehicle and the front vehicle are in motion and the test vehicle is following the front vehicle;
        measure, using the internal sensor, changes in acceleration of the test vehicle;
        mark a first time in response to braking by the front vehicle;
        detect, from the distance between the test vehicle and the front vehicle, that the test vehicle has entered a dangerous situation, the dangerous situation occurring when the distance between the test vehicle and the front vehicle is less than or equal to a minimum safe distance as defined by the vehicle operation safety model to mark a second time;
        detect, from the changes in acceleration of the test vehicle, braking by the test vehicle to mark a third time, a difference between the second time and the third time being a response time for the test vehicle;
        detect a stop by the test vehicle and the front vehicle to mark a fourth time;
        write to a log:
            the distance between the test vehicle and the front vehicle between the first time and the fourth time;
            the response time;
            acceleration, from the changes in acceleration of the test vehicle, of the test vehicle between the second time and the second time plus the response time; and
            deceleration, from the changes in acceleration of the test vehicle, of the test vehicle between the second time plus the response time and the fourth time;
        calculate, using data from the log, a maximum acceleration of the test vehicle during the response time;
        calculate, using data from the log, a minimum braking deceleration of the test vehicle after the response time; and
        produce a compliance measurement for the test vehicle by comparing the distance between the test vehicle and the front vehicle between the first time and the fourth time, the response time, the maximum acceleration, and the minimum braking; deceleration to respective predefined values.

2. The apparatus of claim 1, wherein the processing circuitry is configured to write the second time indicating that the test vehicle entered the dangerous situation to the log.

3. The apparatus of claim 2, wherein, to produce the compliance measurement for the distance between the test vehicle and the front vehicle between the first time and the fourth time, the processing circuitry is configured to:
    indicate compliance for the distance between the test vehicle and the front vehicle between the first time and the fourth time in response to the distance between the test vehicle and the front vehicle between the first time and the fourth time being greater than or equal to a predefined safe distance margin in the predefined values.

4. The apparatus of claim 1, wherein, to produce the compliance measurement for the response time, the processing circuitry is configured to:
    indicate compliance for the response time in response to the response time being less than or equal to a deviation caused by measurement instrument and a predefined response time in the predefined values.

5. The apparatus of claim 1, wherein, to produce the compliance measurement for the maximum acceleration, the processing circuitry is configured to:
    indicate compliance for the maximum acceleration in response to the maximum acceleration being less than or equal to a deviation caused by a road surface and a predefined maximum acceleration in the predefined values.

6. The apparatus of claim 1, wherein, to produce the compliance measurement for the minimum braking deceleration, the processing circuitry is configured to:
    indicate compliance in response to a predefined minimum braking deceleration plus a first deviation caused by a road surface under braking being less than or equal to the minimum braking deceleration being less than or equal to a predefined maximum acceleration plus a second deviation cause by the road surface under acceleration, the predefined minimum braking deceleration and the predefined maximum acceleration being in the predefined values.

7. The apparatus of claim 1, wherein the test vehicle is at twenty percent maximum velocity prior to the first time.

8. The apparatus of claim 1, wherein the test vehicle is at fifty percent maximum velocity prior to the first time.

9. The apparatus of claim 1, wherein the test vehicle is at eighty percent maximum velocity prior to the first time.

10. The apparatus of claim 1, wherein the test vehicle and the front vehicle are at a constant speed prior to the first time.

11. The apparatus of claim 1, wherein the test vehicle is at maximum acceleration at the first time.

12. The apparatus of claim 1, wherein the distance between the test vehicle and the front vehicle when the test vehicle and the front vehicle are moving with the test vehicle following the front vehicle is measured by a sensor with a margin of error less than or equal to a tenth of a meter.

13. The apparatus of claim 1, wherein the changes in the acceleration of the test vehicle are measured by a sensor with a margin of error less than or equal to a tenth of a meter per second squared.

14. The apparatus of claim 1, wherein the response time has a margin of error less than or equal to ten milliseconds.

15. A method for vehicle operation safety model compliance measurement, the method comprising:
measuring a distance between a test vehicle and a front vehicle when the test vehicle and the front vehicle are in motion and the test vehicle is following the front vehicle;
measuring changes in acceleration of the test vehicle;
marking a first time in response to braking by the front vehicle;
detecting, from the distance between the test vehicle and the front vehicle, that the test vehicle has entered a dangerous situation, the dangerous situation occurring when the distance between the test vehicle and the front vehicle is less than or equal to a minimum safe distance as defined by the vehicle operation safety model to mark a second time;
detecting, from the changes in acceleration of the test vehicle, braking by the test vehicle to mark a third time, a difference between the second time and the third time being a response time for the test vehicle;
detecting a stop by the test vehicle and the front vehicle to mark a fourth time;
logging:
the distance between the test vehicle and the front vehicle between the first time and the fourth time;
the response time;
acceleration, from the changes in acceleration of the test vehicle, of the test vehicle between the second time and the second time plus the response time; and
deceleration, from the changes in acceleration of the test vehicle, of the test vehicle between the second time plus the response time and the fourth time;
calculating, from the logging, a maximum acceleration of the test vehicle during the response time;
calculating, from the logging, a minimum braking deceleration of the test vehicle the response time; and
producing a compliance measurement for the test vehicle by comparing the distance between the test vehicle and the front vehicle between the first time and the fourth time, the response time, the maximum acceleration, and the minimum braking deceleration to respective predefined values.

16. The method of claim 15, wherein the logging includes logging the second time indicating that the test vehicle entered the dangerous situation.

17. The method of claim 16, wherein producing the compliance measurement for the distance between the test, vehicle and the front vehicle between the first, time and the fourth time includes:
indicating compliance for the distance between the test vehicle and the front vehicle between the first time and the fourth time in response to the distance between the test vehicle and the front vehicle between the first time and the fourth time being greater than or equal to a predefined safe distance margin in the predefined values.

18. The method of claim 15, wherein producing the compliance measurement for the response time includes:
indicating compliance for the response time in response to the response time being less than or equal to a deviation caused by measurement instrument and a predefined response time in the predefined values.

19. The method of claim 15, wherein producing the compliance measurement for the maximum acceleration includes:
indicating compliance for the maximum acceleration in response to the maximum acceleration being less than or equal to a deviation caused by a road surface and a predefined maximum acceleration in the predefined values.

20. The method of claim 15, wherein producing the compliance measurement for the minimum braking deceleration includes:
indicating compliance in response to a predefined minimum braking deceleration plus a first deviation caused by a road surface under braking being less than or equal to the minimum braking deceleration being less than or equal to a predefined maximum acceleration plus a second deviation cause by the road surface under acceleration, the predefined minimum braking deceleration and the predefined maximum acceleration being in the predefined values.

21. The method of claim 15, wherein the test vehicle is at twenty percent maximum velocity prior to the first time.

22. The method of claim 15, wherein the test vehicle is at fifty percent maximum velocity prior to the first time.

23. The method of claim 15, wherein the test vehicle is at eighty percent maximum velocity prior to the first time.

24. The method of claim 15, wherein the test vehicle and the front vehicle are at a constant speed prior to the first time.

25. The method of claim 15, wherein the test vehicle is at maximum acceleration at the first time.

26. The method of claim 15, wherein the distance between the test vehicle and the front vehicle when the test vehicle and the front vehicle are moving with the test vehicle following the front vehicle is measured by a sensor with a margin of error less than or equal to a tenth of a meter.

27. The method of claim 15, wherein the changes in the acceleration of the test vehicle are measured by a sensor with a margin of error less than or equal to a tenth of a meter per second squared.

28. The method of claim 15, wherein the response time has a margin of error less than or equal to ten milliseconds.

29. A non-transitory machine readable medium including instructions that, when executed by processing circuitry, cause the processing circuitry to perform operations comprising:
measuring a distance between a test vehicle and a front vehicle when the test vehicle and the front vehicle are in motion and the test vehicle is following the front vehicle;
measuring changes in acceleration of the test vehicle;
marking a first time in response to braking by the front vehicle;
detecting, from the distance between the test vehicle and the front vehicle, that the test vehicle has entered a dangerous situation, the dangerous situation occurring when the distance between the test vehicle and the front vehicle is less than or equal to a minimum safe distance as defined by a vehicle operation safety model to mark a second time;
detecting, from the changes in acceleration of the test vehicle, braking by the test vehicle to mark a third time, a difference between the second time and the third time being a response time for the test vehicle;
detecting a stop by the test vehicle and the front vehicle to mark a fourth time;
logging:
the distance between the test vehicle and the front vehicle between the first time and the fourth time;
the response time;
acceleration, from the changes in acceleration of the test vehicle, of the test vehicle between the second time and the second time plus the response time; and deceleration, from the changes in acceleration of the test vehicle, of the test vehicle between the second time plus the response time and the fourth time;

calculating, from the logging, a maximum acceleration of the test vehicle during the response time;

calculating, from the logging, a minimum braking deceleration of the test vehicle after the response time; and producing a compliance measurement for the test vehicle by comparing the distance between the test vehicle and the front vehicle between the first time and the fourth time, the response time, the maximum acceleration, and the minimum braking deceleration to respective predefined values.

\* \* \* \* \*

UNITED STATES PATENT AND TRADEMARK OFFICE
CERTIFICATE OF CORRECTION

PATENT NO. : 11,697,406 B2
APPLICATION NO. : 17/789712
DATED : July 11, 2023
INVENTOR(S) : Zhu et al.

Page 1 of 1

It is certified that error appears in the above-identified patent and that said Letters Patent is hereby corrected as shown below:

On the Title Page

In item (71), in "Applicants", in Column 1, Lines 2-5, delete "(IL); Qianying Zhu, Beijing (CN); Ping Guo, Beijing (CN); Xinxin Zhang, Beijing (CN); Fei Li, Beijing (CN); Xiangbin Wu, Beijing (CN)" and insert --(IL)-- therefor In the Claims In Column 21, Line 66, in Claim 1, delete "braking;" and insert --braking-- therefor In Column 23, Line 36, in Claim 15, after "vehicle", insert --after--

In Column 23, Line 47, in Claim 17, delete "test," and insert --test-- therefor

In Column 23, Line 48, in Claim 17, delete "first," and insert --first-- therefor Signed and Sealed this
Twelfth Day of November, 2024

Katherine Kelly Vidal
*Director of the United States Patent and Trademark Office*